(12) United States Patent
Rodewald (10) Patent No.: US 8,721,814 B2
(45) Date of Patent: May 13, 2014

(54) USE OF A STRIP OF AN ADHESIVE TAPE TO REINFORCE CARDBOARD PACKAGING PARTICULARLY IN THE REGION OF DIE-CUTS, AND SIMULTANEOUSLY AS A TEAR STRIP FOR SUCH PACKAGING

(75) Inventor: Ilse Rodewald, Charlotte, NC (US)

(73) Assignee: tesa SE, Hamburg (DE)

( * ) Notice: Subject to any disclaimer, the term of this patent is extended or adjusted under 35 U.S.C. 154(b) by 343 days.

(21) Appl. No.: 12/620,972

(22) Filed: Nov. 18, 2009

(65) Prior Publication Data

US 2010/0127062 A1 May 27, 2010

(30) Foreign Application Priority Data

Nov. 21, 2008 (DE) .......................... 10 2008 058 537

(51) Int. Cl.
*B29C 65/00* (2006.01)
*B31B 1/60* (2006.01)
*B32B 37/00* (2006.01)
*B31B 1/68* (2006.01)
*B65D 17/00* (2006.01)

(52) U.S. Cl.
USPC .............................. 156/60; 229/240; 493/383

(58) Field of Classification Search
USPC ............................... 156/60; 229/240; 493/383
See application file for complete search history.

(56) References Cited

U.S. PATENT DOCUMENTS

| 2,956,904 A | 10/1960 | Hendricks |
| 3,088,848 A | 5/1963 | Tritsch |
| 3,187,982 A | 6/1965 | Underwood et al. |
| 3,311,032 A | 3/1967 | Lucas |
| 3,482,683 A | 12/1969 | Desnoyers |
| 6,586,073 B2 * | 7/2003 | Perez et al. ................... 428/141 |
| 2003/0072906 A1* | 4/2003 | Wenninger et al. .......... 428/40.1 |

FOREIGN PATENT DOCUMENTS

| CA | 749198 | 12/1966 |
| DE | 2104817 | 8/1971 |
| DE | 4338524 | 5/1995 |
| EP | 0269967 | 6/1988 |
| WO | WO 2008/077883 | * 7/2008 ................ C09J 7/02 |

OTHER PUBLICATIONS

WO 2008/077883 machine translation, Rodewald et al., translated Feb. 12, 2012.*
Ullmann's Encyclopedia of Industrial Chemistry, 2008, J. Wiley & Sons, Inc. New York, NY, pp. 43-44.

* cited by examiner

*Primary Examiner* — Michael Orlando
(74) *Attorney, Agent, or Firm* — Norris McLaughlin & Marcus, P.A.

(57) ABSTRACT

The invention relates to the use of a strip of an adhesive tape for reinforcing cardboard packaging particularly in the region of die-cuts and simultaneously as a tear strip for said cardboard packaging, characterized in that a polyolefin film oriented monoaxially in the lengthwise direction of the strip is used as carrier material for the adhesive tape, the film comprising a mixture of an olefinic and a polar non-olefinic polymer.

4 Claims, 4 Drawing Sheets

USE OF A STRIP OF AN ADHESIVE TAPE TO REINFORCE CARDBOARD PACKAGING PARTICULARLY IN THE REGION OF DIE-CUTS, AND SIMULTANEOUSLY AS A TEAR STRIP FOR SUCH PACKAGING

The invention relates to the use of a strip of an adhesive tape to reinforce cardboard packaging particularly in the region of die-cuts, and simultaneously as a tear strip for such packaging, and also to a carton equipped with the strip.

Within the corrugated and solid board industry there is a large market for adhesive reinforcing tapes based on pressure-sensitive and hotmelt adhesives.

Corrugated and solid board both have a tendency, on account of their paper-based properties, to suffer tear incision at edges which are exposed to increased load. Edges in this case are, for example, the corners on closure flaps in the case of corrugated board boxes, or the edges produced when holes are punched out for carry handles.

Particular loads are, for example, the repeated opening and closing of folding boxes or else the carrying of a corrugated board box with the aid of hand engagement cutouts. Commonly, under a relatively high load, the solid or corrugated board yields and suffers tear incision. In the first case, the exterior of the packaging becomes unsightly, and, in the second case, the important extra benefit of the carry handle is in fact destroyed.

A third example of the use of reinforcing tapes is the anti-bulge reinforcement of large packaging forms such as corrugated pack octatainers (octagonal containers for bulk goods) for the packaging, shipping and storing of, for example, granules. Reinforcing tapes, which are regularly placed like rings around the pack, provide the pack with local reinforcements, which reduce or prevent bulging due to the load of the contents.

Figure 1:
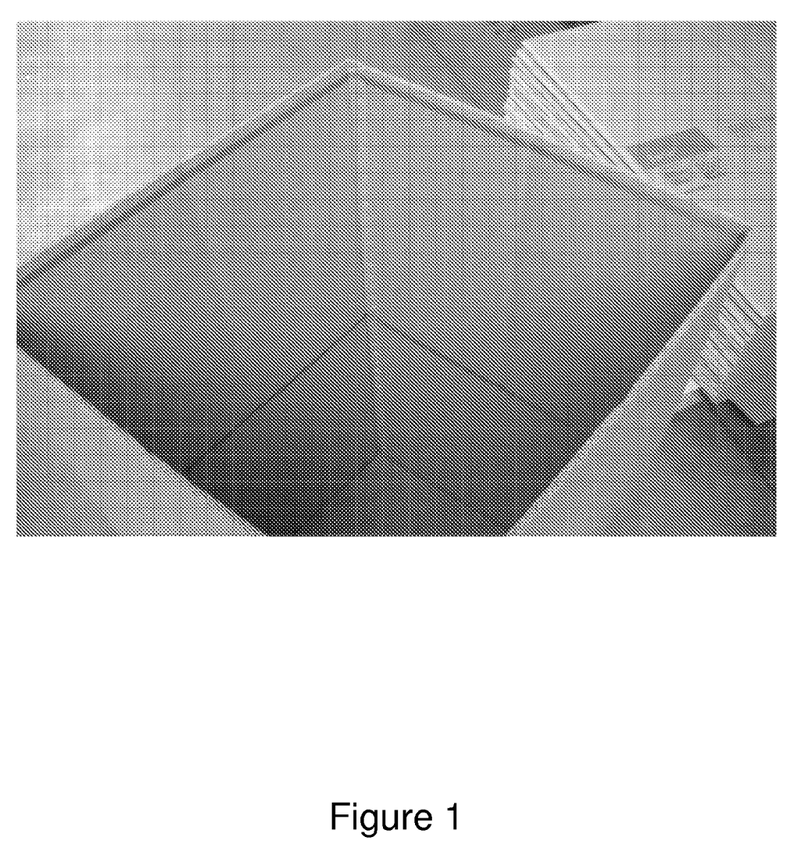
FIG. 1 shows a corrugated board box which to counter bulging is equipped with a plurality of adhesive reinforcing tapes at different heights.

FIG. 1 shows a corrugated board box which to counter bulging is equipped with a plurality of adhesive reinforcing tapes at different heights.

This property can also be utilized on a smaller scale, by reinforcing boxes that have to be stacked in the course of despatch and storage, using an adhesive tape in the manner just described, in order to increase the box compression resistance. This either makes it possible to increase the stacking height, or else contains the possibility of lowering the grammage of the box paper and so reducing the amount of raw material employed.

Another large market within the solid and corrugated board industry is the use of tear strips. These are narrow tapes, obtainable either with pressure-sensitive or hotmelt adhesive, which make it possible, by their application to the inside of a solid or corrugated board pack, to open said pack without additional mechanical assistance, by tear extraction of the strip. Above all this provides increased safety for the contents of the pack when it is opened, since these contents may be damaged by the use of knives of scissors. In one version the box may have a perforation running round it, although this harbours the disadvantage that the stack compression resistance of the box is reduced.

Tear strips are known and serve in various forms as an opening aid on the one hand for cigarette packs, confectionary packs and similar packs which are wrapped with a film, and on the other hand for cardboard packaging such as detergent packs, for instance. In such applications the tear strip is affixed to the pack in such a way that, for the purpose of opening, the tear strip is pulled and hence the wrapping film and/or the carton is destroyed at the desired point.

Traditionally in use are tear strips provided on one side of a hotmelt-based adhesive. These strips are described in, for example, U.S. Pat. No. 3,187,982 A, U.S. Pat. No. 3,311,032 A or CA 749 198 A.

Also in use is a tear strip which is self-adhesive. For this purpose a monoaxially oriented carrier film is used which is equipped with a self-adhesive layer on one side and with a silicone release layer on the other side. Optionally there is printing beneath one of the two layers. Constructions of this or similar kind are known for the production of pressure-sensitive adhesive tapes from, for example, DE 21 04 817 A, U.S. Pat. No. 3,088,848 A, U.S. Pat. No. 3,482,683 A or U.S. Pat. No. 2,956,904 A. Not disclosed in these specifications is the use of such film constructions for self-adhesive tear strips. The use of self-adhesive tapes of this kind as tear strips is referred to, however, in the journal "Packaging Review" from Feb. 1973, page 57.

One specific embodiment of these self-adhesive tear strips is described by DE 43 38 524 A1. Disclosed therein is a self-adhesive tear strip composed of a carrier film, a release layer, a layer of adhesive facing away from the release layer, and, if desired, printing beneath the layer of adhesive or the release layer. The strip is characterized in that the carrier film is composed of an oriented film, in that the release layer and layer of adhesive are applied from aqueous solution, emulsion or dispersion, and in that release layer, printing ink and layer of adhesive are applied to a film which is broader by a multiple than the tear strip, in one operation on a machine.

Customary for use as an opening aid for film packs are at least monoaxially, preferably biaxially, oriented and at least one-layer carrier films which are 15 to 60 µm thick.

Self-adhesive or heat-activativable tear strips comprising polypropylene film which has been oriented in machine direction have long been in use for the tear-opening of cardboard packaging. They are available in film thicknesses from 50 to 140 µm. Film thicknesses greater than 85 µm find use in the opening of particularly heavy cardboard packaging. More customary are tear strips in thicknesses between 60 and 90 µm.

Tear strips which are based on a monoaxially oriented polypropylene carrier frequently use, for the carrier, a specific polymer blend which has been optimized in terms of its tear-opening performance and which results in machine-direction tensile strengths of 230 to 330 N/mm².

These polypropylene tear strips, at preferably 60 to 65 µm, exhibit flawless tear-open performance on all corrugated cardboard packaging, including micro-corrugated board. This applies irrespective of whether tearing is performed exactly in the direction of the adhered strip.

"Exactly in the direction of the adhered strip" means that, in the operation of tear opening, the tear strip is guided in such a way that the pulling direction never deviates from the direction which is mandated by the tear strip bonded to the reverse of the carton and which is also visible from the front of the carton as a tear-open joint during the tear-open operation. Only in that case is the distribution of forces in the tear strip symmetrical during the tear-open operation, and the load on both cut edges uniform. In actual practice this ideal tear-open direction is usually not observed. Deviations from this direction of up to about 30° must be expected.

A trend within the market for tear strips is the deviation from the film formula that has been optimized for tear-open performance. Reduced tear-open performance in this case is accepted willingly in order, in contrast, to obtain improved machine compatibility of the tear strip during its application.

For example, it is possible to reduce the impact modifiers to below the amount that is advisable for optimum tear-open performance, up to the point of their complete omission.

Heavy-duty solid board grades at about 1000 g/m² can be torn open faultlessly only in the optimum tear-open direction. In the event of deviation from this direction, the unsymmetrical load on the strip may result in tears during the tear-open operation that start from the more heavily loaded edge of the strip. The frequency of the tears is influenced, for example, by inhomogeneities in the film, by microindentations in the cut edges of the film strips, by wood particles or particularly solidified particles in the board, and similar phenomena. Also possessing an influence is the speed of tearing.

For the packaging of laundry detergents, use is made to a relatively large extent of solid boards with a basis weight of between 450 and 600 g/m², which in some cases have a wax-impregnated interlayer, but in any case are provided with a laminated-on top layer of high-gloss cast-coated Chromolux papers. Tearing open these boards using the polypropylene tear strips can be accomplished only with a similarly poor result as for the abovementioned 1000 g/m² solid boards.

Known from EP 0 269 967 A1 is a tear strip having a carrier oriented in predominantly one direction and being provided with an adhesive layer, the carrier being composed of at least one base layer which is provided with at least one tough layer which is tougher than the base layer.

Particularly preferred is a tear strip having a carrier which is oriented in predominantly one direction and which is provided with an adhesive layer, the carrier being composed of at least one base layer comprising a polypropylene-olefin copolymer and/or a polypropylene/impact modifier mixture, the base layer being provided with at least one tough, polypropylene-containing layer which comprises an impact modifier and is tougher than the base layer.

In the description of single-sidedly adhesive tear strips, the prior art applies a release to the side facing away from the adhesive: an example is the aforementioned DE 43 38 524 A1.

In the case of polypropylene-based tear strips it is preferred to use TPP (corresponding to monoaxially oriented polypropylene (MOPP)), since the stretch must be low even under high tensile load.

High tensile loads come about, firstly, in the end application, when the tear strip is pulled when the pack is being opened, through the board or the carton and/or the film, and is intended to break these materials apart reliably. Such loads, secondly, also come about when the tear strip is being applied to the packaging, since it is frequently applied at speeds of more than 150 m/min. Particularly at the start, in other words when the tear strip is placed onto—for example—the board, the roll, up to about 15 kg in weight, to which the tear strip has customarily been converted is accelerated suddenly and violently. Even in ongoing operation, tensile stresses of more than 8 N are often acting on the tear strip. This rules out the use of unoriented or even biaxially oriented polypropylene.

If TPP without a release is used, then unwinding, i.e. the separation of adhesive and carrier, is accompanied by splicing of the carrier, which means that some of the fibres stretched and oriented in the longitudinal direction are extracted from the surface of the carrier. This may adversely affect the converting operation if the coated film web, which is very much wider than the tear strip, is slit into individual tear strips and for that purpose is unwound from the jumbo roll. The fibres projecting from the surface of the carrier themselves hinder the operation, or else there may be tearing of the carrier web as a whole. Moreover, similar problems may occur in the course of application to the packaging when the tear strip is being unwound.

Adhesive reinforcing tapes and tear strips are often located in similar regions of the packaging, which means that the two tapes must be applied very close to one another.

From a technical standpoint this is often possible only in two separate steps, which in turn raises the production costs. Often, therefore, one of the two possibilities is abandoned, in order to minimize the complexity of the packaging.

Available on the market is a combination of both, in the form of a reinforcing strip which is based on a hotmelt adhesive. The reinforcing strip is composed of a bundle of polyester fibres, not twisted or entangled, which is embedded in a matrix of hotmelt adhesive, the polyester fibres being aligned in machine direction. This bundle of fibres is adhered to the inside of the corrugated board by melting of the matrix, and it serves there, initially, as a reinforcing strip. Partial cut scoring in the middle of the strip (as viewed in the middle relative to the width) in the further-processing operation affords the possibility for a part of this fibre bundle to be extracted from the composite and used as a tear strip. The hotmelt adhesive-based reinforcing strips with the incorporated fibres, however, have a number of disadvantages in the operation of processing the solid and corrugated boards. These disadvantages derive essentially from the thickness of the tapes. The thickness of these tapes is often 200 to 350 μm. This leads, firstly, to problems with regard to the stacking of the corrugated board sheets and the folded boxes. Because the strip is always applied to the same point on a sheet, there is an increase in thickness at this site in the stack. This skews the stack, and, above a certain degree of inclination, the sheets begin to slip. Stacking must therefore be carried out more deeply than in the case of stacking without reinforcing strips. This raises the number of pallets required and hence increases the production complexity.

Furthermore, there may be problems during the printing of such sheets; as a result of the different thicknesses of the print substrate, there are different printing relationships in the printing operation, and this can result in an uneven printed image.

It is therefore of interest for the processors of corrugated packing sheets with reinforcing strips, above all, to utilize thin adhesive tapes, in order not to give rise to such problems.

Accordingly, the combination of a film-based reinforcing strip with a likewise film-based tear strip harbours a great potential, since these reinforcing strips, equipped with a pressure-sensitive adhesive, generally have a total thickness of 60 to 200 μm and so do not give rise to the problems stated above, while nevertheless having a suitable reinforcing action.

To date, however, it has not been possible to realize such a combination, since it has not been possible for the materials used so far, such as MOPP (monoaxially oriented polypropylene), to be subjected to any known and commercially practicable further-processing operation.

Generally speaking, MOPP films, of the kind utilized as carriers in adhesive strapping tapes and also in adhesive tapes for reinforcement applications, have a tendency towards easy tear propagation in machine direction. Over a longer length, however, this tearing cannot be reliably ensured. If a bonded adhesive tape with a carrier made from an MOPP film were to be given a partial cut score in the manner specified above, it would indeed be possible to extract a narrow strip of the adhesive tape ends and to use it as a tear strip.

Figure 2:
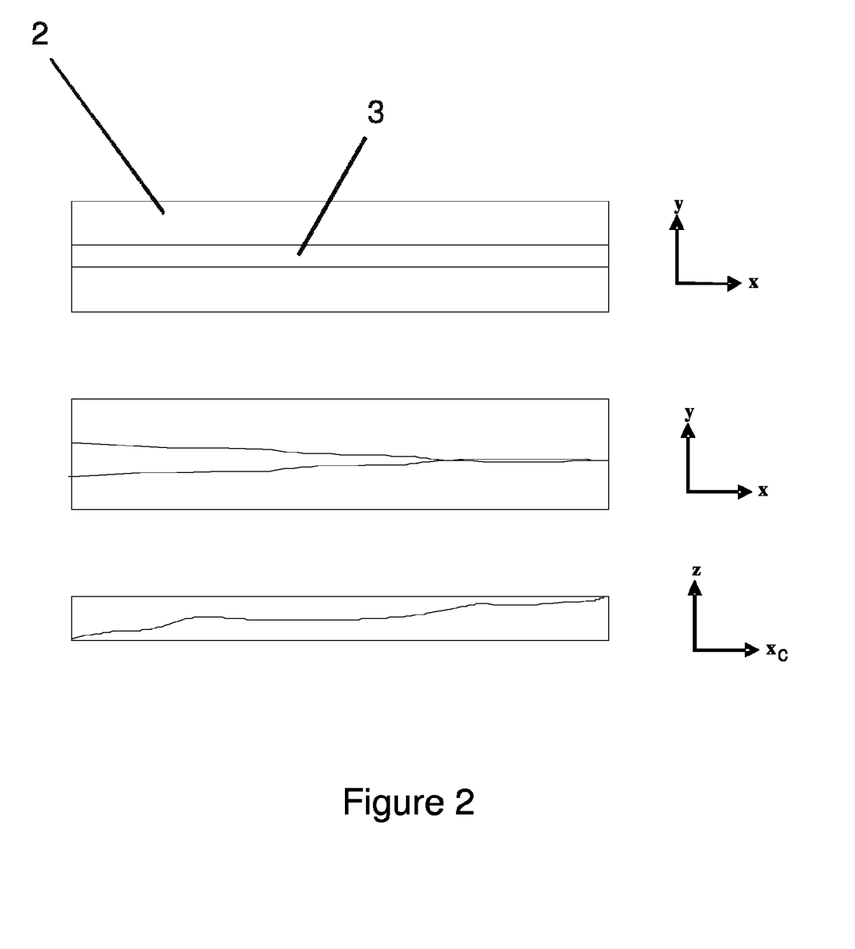
FIG. 2 shows a reinforcing strip 2 of the kind which could be bonded to the corrugated board of a pack.

FIG. 2 shows a reinforcing strip 2 of the kind which could be bonded to the corrugated board of a pack. One part of the reinforcing strip serves, when the pack is to be opened, as a tear strip 3, which is formed by partial cut scoring (not shown) within the reinforcing strip 2.

In FIG. 2, the top part shows the appearance of the optimum tear strip, while the middle and the bottom show the appearance of a tear strip which is not suitable.

The optimum tear strip (as described in accordance with the invention) severs the reinforcing strip and also the board above it in a clean line. In particular, the width of the tear strip remains constant over its entire length.

The situation is different in the case of a tear strip which is not suitable, as for example one made from a MOPP film. Because of the low cross-direction tear propagation resistance of the MOPP film, this strip exhibits disadvantageous tapering in the course of the tear-open operation, through to the point of complete tearing (see FIG. 2, middle). This is a result of the fact that, during the use of a tear strip, it is often not pulled exactly parallel to its bonding direction (x) through the carton, but instead tends to be pulled at a varying, deviant angle. This gives rise to forces which act not only parallel in the direction of stretching but also, in deviation therefrom, in the y-direction.

Even if the tear strip were to be pulled exactly parallel to the bonding direction, there are still forces acting in the z-direction when a strip of this kind is being extracted from a film tape. These forces likewise result in the tearing of the tear strip (see FIG. 2, bottom).

The strip tapers both in its width (FIG. 2, middle) and in its thickness (FIG. 2, bottom).

It is an object of the invention to provide an adhesive tape which combines two functions, being able to serve, firstly, as a reinforcing strip for cardboard packaging, particularly in the region of die-cuts, and, secondly, and simultaneously, as a tear strip for such packaging.

This object is achieved through the use of an adhesive tape as described hereinbelow and also a carton equipped with the adhesive tape.

BRIEF DESCRIPTION OF THE DRAWINGS

The invention is described in greater detail with reference to the drawings, wherein.

The invention accordingly provides for the use of a strip of an adhesive tape for reinforcing cardboard packaging, particularly in the region of die-cuts, and, at the same time, as a tear strip for said cardboard packaging, the carrier material used for the adhesive tape being a polyolefin film oriented monoaxially in the longitudinal direction of the strip, and the film comprising a mixture of an olefinic and a polar non-olefinic polymer.

The fraction of polar non-olefinic polymer in the mixture is preferably in the range from 5% to 30% by weight.

In order to achieve high tensile strengths, high stresses at 10% strain, and high tear propagation resistance, the conditions of the stretching operation ought to be selected such that the stretching ratio is the maximum which can be accomplished technically for the film in question. In accordance with the invention the machine-direction stretching ratio is preferably at least 1:4.5, more preferably at least 1:7.

A stretching ratio of, for example, 1:6 indicates the formation, from a section of the primary film 1 m in length, of a section of the stretched film with a length of 6 m. Often the stretching ratio is identified as the ratio of the linear speed prior to stretching and the linear speed after stretching. Here it is the first definition which is used.

In one preferred embodiment of the invention the film has the following properties:
- a machine-direction tensile strength of at least 200 N/mm$^2$, preferably at least 300 N/mm$^2$, more preferably at least 400 N/mm$^2$,
- a machine-direction stress at 10% strain of at least 150 N/mm$^2$, preferably at least 200 N/mm$^2$, more preferably at least 250 N/mm$^2$, and/or
- a cross-direction tear propagation resistance of at least 400 N/mm, preferably at least 800 N/mm, more preferably at least 1500 N/mm.

Strength values are calculated by dividing the width-based force values by the thickness. Where the strength values are determined on the adhesive tape, the thickness taken as a basis is not the overall thickness of the adhesive tape, but only that of the carrier film.

The thickness of the carrier film is preferably between 15 and 200 µm, more preferably between 30 and 140 µm, very preferably between 50 and 90 µm.

The olefinic polymer is a homopolymer or copolymer of olefins such as ethylene, propylene or butylene. The term copolymer is to be understood here to include terpolymers.

The olefinic polymer preferably contains at 50% by weight of propylene.

Particularly suitable film raw materials are commercially available polypropylene homopolymers or polypropylene copolymers, including the block polymers (impact polymers) and random polymers.

The melt indices of the stated polymers must be situated within the range that is suitable for flat film extrusion. This range ought to be between 0.3 and 15 g/10 min, preferably in the range from 0.8 to 5 g/10 min (measured at 230° C./2.16 kg).

The polypropylene is preferably predominantly isotactic in structure. The flexural modulus ought to be at least 1000 MPa, preferably at least 1500 MPa, very preferably at least 2000 MPa.

A polar non-olefinic polymer comprehends all polymers which
 a) contain no olefin monomer such as ethylene, propylene or butylene, for example, and
 b) include as a polar component heteroatoms such as sulphur, nitrogen, phosphorus and, preferably, oxygen.

The polar non-olefinic polymer is selected preferably from the group consisting of polyesters, polyamides, polyurethanes, polyoxymethylene, polyarylene sulphides and polyarylene oxides. Partially crystalline polymers are particularly preferred. In one particularly advantageous embodiment of the invention the polar non-olefinic polymer selected is polybutylene terephthalate and/or polyoxymethylene.

In the preferred embodiment the matrix is composed of the olefinic polymer, the polar non-olefinic polymer being embedded in the form of fibres.

The fibres have a diameter of preferably 0.01 to 50 µm, more preferably 0.1 to 20 µm.

The dimensions of the fibres and hence the mechanical properties of the film can be adjusted through the production operation and through the addition of a polar-modified polyolefin as a third component in the mixture.

The polar-modified polyolefin is preferably selected from the group of the copolymers of olefins with vinyl esters, methacrylic acid and acrylic acid, more preferably ethylene-vinyl acetate and ethylene-(meth)acrylate copolymers and also their esters or from the group of graft polymers with an unsaturated organic acid, more preferably a polyolefin grafted with maleic anhydride, methacrylic acid or acrylic acid, the fraction of polar-modified polyolefin in this mixture being preferably in the range from 0.2% to 10% by weight.

The polymers of the film can be used in pure form or as a blend with additives such as antioxidants, light stabilizer, anti-blocking, lubricating and processing assistants, fillers, dyes, pigments, blowing agents or nucleating agents.

The film can be used, for example, as a carrier for an adhesive tape. An adhesive tape of this kind is suitable for reinforcing cardboard packaging, particularly in the region of die-cuts, as a tear strip for cartons, and for the bundling of articles. Such articles are, for example, tubes, profiles or stacked cartons (strapping application). Since the film of the invention is virtually impossible to tear through in the transverse direction, even in the case of damaged edges, it is possible to avoid tears of tear strips or the propagation of tearing in reinforced carton die-cuts. Films of this kind tend toward extension of a tear in the lengthwise direction, which in the case of edge damage or partial cut scoring prevents the film being torn off in the transverse direction, by diversion of the tear into the lengthwise direction.

The preferred operation of producing the film, or of an adhesive tape of this invention that is produced using the film, involves the following steps:
  polymers and, where appropriate, additives are mixed and supplied in an extruder to a flat film die.
  the melt film is then subjected to controlled cooling on what is known as a chill roll.
  before the film web is supplied to the stretching unit, it is heated to a suitable stretching temperature via temperature-controlled rolls.
  the film is then subjected to short-gap orientation in machine direction.
  the carrier film is provided with an adhesive by coating or even beforehand by coextrusion.

The film may be a single-layer or multi-layer film; preferably it is multi-layer, more preferably of the ABC type, where B comprises the mixture of the invention and A and C are composed entirely or predominantly of polyolefinic polymer. Through coextrusion it is possible to avoid deposits in the course of stretching of the film, and problems in the course of coating with release, primer or adhesive.

The film may be modified by lamination, embossing or radiation treatment.

The film may be surface-treated. Such treatments are, for example, for the purpose of promoting adhesion, corona, flame, fluorine or plasma treatment, or coated application of solutions or dispersions or liquid, radiation-curable materials. Further possible coatings are printed coatings and non-stick coatings, for example those of crosslinked silicones, acrylates (for example Primal® 205), polymers with vinylidene chloride or vinyl chloride as monomer, or stearyl compounds such as polyvinyl stearylcarbamate or chromium stearate complexes (for example Quilon® C) or reaction products of maleic anhydride copolymers and stearylamine.

A preferred adhesive tape in accordance with the invention is a film having a self-adhesive or heat-activable layer of adhesive. The adhesives in question are, however, preferably not sealable adhesives, but pressure-sensitive adhesives. For the adhesive tape application, the film is coated on one or both sides with pressure-sensitive adhesive in the form of a solution or dispersion or in 100% form (for example, from the melt), or by coextrusion with the film. The adhesive layer or layers may be crosslinked by heat or high-energy radiation and, where necessary, may be lined with release film or release paper. Suitability is possessed more particularly by pressure-sensitive adhesives based on acrylate, natural rubber, thermoplastic styrene block copolymer or silicone.

The general expression "adhesive tape" encompasses, for the purposes of this invention, all planar structures such as two-dimensionally extended films or film sections, tapes with extended length and limited width, tape sections and the like, and also, finally, die-cuts or labels.

In order to optimize the properties it is possible for the self-adhesive composition employed to be blended with one or more additives such as tackifiers (resins), plasticizers, fillers, pigments, UV absorbers, light stabilizers, ageing inhibitors, crosslinking agents, crosslinking promoters or elastomers.

Suitable elastomers for blending are, for example, EPDM rubber or EPM rubber, polyisobutylene, butyl rubber, ethylene-vinyl acetate, hydrogenated block copolymers of dienes (for example by hydrogenation of SBR, cSBR, BAN, NBR, SBS, SIS or IR; such polymers are known, for example, as SEPS and SEBS), or acrylate copolymers such as ACM.

Tackifiers are, for example, hydrocarbon resins (for example, of unsaturated $C_5$ or $C_7$ monomers), terpene-phenolic resins, terpene resins composed of raw materials such as α- or β-pinene, aromatic resins such as coumarone-indene resins, or resins of styrene or α-methylstyrene such as rosin and its derivatives, such as disproportionated, dimerized or esterified resins, possible compounds for use here being glycols, glycerol or pentaerythritol. Particular suitability is possessed by ageing-stable resins without an olefinic double bond, such as hydrogenated resins, for example.

Examples of suitable fillers and pigments include carbon black, titanium dioxide, calcium carbonate, zinc carbonate, zinc oxide, silicates or silica.

Suitable UV absorbers, light stabilizers and ageing inhibitors for the adhesives are those as set out in this specification for the stabilization of the film.

Examples of suitable plasticizers are aliphatic, cycloaliphatic and aromatic mineral oils, diesters or polyesters of phthalic acid, trimellitic acid or adipic acid, liquid rubbers (for example nitrile rubbers or polyisoprene rubbers), liquid polymers of butene and/or isobutene, acrylic esters, polyvinyl ethers, liquid resins and plasticizer resins based on the raw materials for tackifier resins, lanolin and other waxes, or liquid silicones.

Examples of crosslinking agents are phenolic resins or halogenated phenolic resins, melamine resins and formaldehyde resins. Examples of suitable crosslinking promoters are maleimides, allyl esters such as triallyl cyanurate, and polyfunctional esters of acrylic and methacrylic acid.

One preferred embodiment comprises a pressure-sensitive adhesive composed of natural rubber, hydrocarbon resin and antioxidant.

The coat thickness of adhesive is preferably in the range from 18 to 50, more particularly 22 to 29 $g/m^2$. The width of the adhesive tape rolls is preferably in the range from 2 to 60 mm.

Test Methods

Thickness: DIN 53370
Tensile strength: DIN 53455-7-5 in machine direction
Tensile stress at 10% strain: DIN 53455-7-5 in machine direction
Tensile strain at break: DIN 53455-7-5 in machine direction Cross-direction tensile impact strength: DIN EN ISO 8256 (clamping length 10 mm, 7.5 J pendulum, 5 plies, 30 g yoke)

Cross-direction tear propagation resistance: DIN 53363-2003-10

Melt index for PP: DIN 53735 (230° C., 2.16 kg)
Melt index for PBT: DIN 53735 (250° C., 2.16 kg)
Melt index for POM/EVAL/PE-LLD: DIN 53735 (190° C., 2.16 kg)
Melt index for PS-HI: DIN 53735 (200° C., 5 kg)
Flexural modulus: ASTM D 790 A
Adhesive data: AFERA 4001 (corresponding to DIN EN 1939)

EXAMPLES

Raw Materials

Dow 7C06:
PP block copolymer, MFI 1.5 g/10 min, non-nucleated, flexural modulus 1280 MPa (Dow Chemical)

Bormod HD 905 CF:
PP homopolymer, MFI 6 g/10 min, flexural modulus 2150 MPa, contains an α-nucleating agent (Borealis)

Dowlex 2032:
PE-LLD, MFI 2 g/10 min (Dow Chemical)

Styron 457:
PS-HI, MFI 3 g/10 min, flexural modulus 2200 MPa (Dow Chemical)

EVAL G156B:
EVAL ethylene content 48 mol %, MFI 6.4 g/10 min, flexural modulus 2800 MPa (EVAL Europe)

Licocene PP MA 7452 GR TP:
PP-g-MA, metallocene polypropylene wax grafted with maleic anhydride (Clariant)

Hostaform C9021 natural:
POM, MFI 8 g/10 min, flexural modulus 2800 MPa (Ticona)

Celanex 2002-2 natural:
PBT, MFI 20, flexural modulus 2500 MPa (Ticona)

Described below, by means of examples, are advantageous embodiments of the adhesive tape of the invention, without any intention thereby to subject the invention to unnecessary restriction.

Shown in addition, by means of three comparative examples, are non-functioning adhesive tapes which are not suitable for the desired use.

Inventive Example 1

The film is produced in one layer on a single-screw extrusion unit with a flat film die having a flexible die lip, followed by a chill roll station and a single-stage short-gap stretching unit.

Dow 7C06, Celanex 2002-2 natural and Licocene PP MA 7452 GR TP are mixed in a 15:4:1 ratio and extruded. The die temperature is 230° C. Chill roll temperatures and stretching roll temperatures are set so as to maximize the crystallinity of the film before and after the stretching operation. The stretching ratio is 1:5.

| Film properties: | |
|---|---|
| Carrier thickness after stretching/μm | 80 |
| Stress at 1% strain/MPa | 23.6 |
| Stress at 10% strain/MPa | 154 |
| Tensile strength/MPa | 220 |
| Strain at break/% | 26 |
| Tear propagation resistance/N/mm | 1220 |
| Tensile impact strength, CD/mJ/mm$^2$ | 63 |

The film is corona-pretreated on both sides, coated on the top face with a 0.5% strength solution of PVSC in toluene, as a release, and dried. The adhesive is mixed from 42% by weight of SIS elastomer, 20% by weight of a pentaerythritol ester of hydrogenated rosin, 37% by weight of a $C_5$ hydrocarbon resin having a R&B value of 85° C., and 1% by weight of Irganox® 1010 antioxidant in the melt, and applied to the bottom face of the film at 150° C., using a die. The adhesive tape is then wound to form a stock roll, and for further investigation slit to a width of 15 mm.

Adhesive Data:
bond strength for steel 2.4 N/cm
unwind force at 0.3 m/min 1.0 N/cm
coat weight 24 g/m$^2$.

Inventive Example 2

The film is produced on a coextrusion unit with a flat film die having a flexible die lip, in three layers in ABA construction, followed by a chill roll station and a single-stage short-gap stretching unit. Both outer layers consist of Bormod HD 905 CF. The middle layer is composed of Bormod HD 905 CF, Hostaform C9021 natural and EVAL G156B, mixed in a 44:5:1 ratio. The die temperature is 230° C. The chill roll temperature and the stretching roll temperatures are set so as to maximize the crystallinity of the film before and after the stretching operation. The stretching ratio is 1:8.

| Film properties: | |
|---|---|
| Carrier thickness after stretching/μm | 60 |
| Stress at 10% strain/MPa | 264 |
| Tensile strength/MPa | 297 |
| Tear propagation resistance/N/mm | 1600 |
| Strain at break % | 12.7 |
| Tensile impact strength, CD/mJ/mm$^2$ | 150 |

The film is corona-pretreated on both sides, coated on the top face with a solvent-free silicone, which is subsequently crosslinked using UV rays. The bottom face is provided with a primer of natural rubber, cyclorubber and 4,4'-diisocyanatodiphenylmethane. The adhesive is a hexane solution of 40% by weight of natural rubber SMRL (Mooney 70), 10% by weight of titanium dioxide, 37% by weight of a $C_5$ hydrocarbon resin having an R&B value of 95° C., and 1% by weight of Vulkanox® BKF antioxidant, produced in a compounder. The 20% by weight adhesive is applied using a coating bar to the primed bottom face of the film, and dried at 115° C. Subsequently the adhesive tape is wound to form a stop roll and for further investigation is slit to a width of 15 mm.

Adhesive Data:
bond strength for steel 1.8 N/cm
unwind force at 0.3 m/min 0.3 N/cm
coat weight 23 g/m$^2$.

Comparative Example 1

A film and an adhesive tape are produced in the same way as in Inventive Example 1 from Dow 7C06 with a stretching ratio of 1:6.1.

| Film properties: | |
|---|---|
| Carrier thickness after stretching/μm | 80 |
| Stress at 1% strain/MPa | 16 |
| Stress at 10% strain/MPa | 142 |
| Tensile strength/MPa | 247 |
| Strain at break/% | 32 |
| Tear propagation resistance/N/mm | 240 |
| Tensile impact strength, CD/mJ/mm$^2$ | 258 |

Comparative Example 2

Dow 7C06 and Styron 457 are mixed in a ratio of 4:1 and the mixture is used to produce a film and an adhesive tape, in the same way as in Inventive Example 1, with a stretching ratio of 1:8.

| Film properties: | |
|---|---|
| Carrier thickness after stretching/μm | 70 |
| Stress at 1% strain/MPa | 12 |
| Stress at 10% strain/MPa | 222 |
| Tensile strength/MPa | 260 |
| Strain at break/% | 39 |
| Tear propagation resistance/N/mm | 217 |
| Tensile impact strength, CD/mJ/mm$^2$ | 312 |

Comparative Example 3

Dow 7C06 and Dowlex 2032 are mixed in a ratio of 41:9 and the mixture is used to produce a film and an adhesive tape, in the same way as in Inventive Example 1, with a stretching ratio of 1:6.4.

| Film properties: | |
|---|---|
| Carrier thickness after stretching/μm | 120 |
| Stress at 1% strain/MPa | 30.3 |
| Stress at 10% strain/MPa | 174 |
| Tensile strength/MPa | 335 |
| Strain at break/% | 33.4 |
| Tear propagation resistance/N/mm | 284 |
| Tensile impact strength, CD/mJ/mm$^2$ | 240 |

Surprisingly, the film as described extensively above does not undergo tear propagation only transversely to the direction of stretching, but instead reliably supports the propagation of a tear by the film in the lengthwise direction. This means that, in the application described above, there is no tapering either in the y-direction (the transverse direction of the strip) or else in the z-direction (the direction that defines the direction of the carrier). As a result, tear propagation becomes possible only in the x-direction (lengthwise or machine direction). Moreover, continuous tear propagation in the x-direction can easily be accomplished additionally manually in order to tear through the corrugated board.

This then makes it possible to combine an adhesive reinforcing tape, on the basis of the film coated with (pressure-sensitive) adhesive, with a tear strip in a single adhesive tape.

Additionally embraced by the concept of the invention is a carton equipped with at least one strip of an adhesive tape for reinforcing in particular in the region of die-cuts, serving simultaneously as a tear strip.

In accordance with one preferred embodiment of the invention, the strip is applied below and/or above engagement holes located in the carton.

With further preference, at least one strip is applied in the form of a self-contained line on the inside of the body of the carton. In one version there are two or more strips at different heights on the body.

The line formed by the strip is preferably situated in a plane oriented parallel to the base of the upright body.

The line may also surround a corner of the body in such a way that, after the strip has been torn open, a tetrahedral portion is separated from the remaining body.

In one version of the invention the strip does not form a self-contained line, but instead makes a gap in one side wall of the carton. When the tear strip is then removed, the final wall remains undestroyed and is able thus to take on the function of a hinge, particularly if the wall has a fold in the continuation of the line of the strip. In this way a lid is formed which can be folded open and closed via the hinge.

Preferably the strip is applied at right angles to the corrugation of the carton.

In accordance with a further preferred embodiment in the strip there is at least one partial cut score which serves as a grip tab for the strip when the carton is torn open.

In accordance with one advantageous embodiment of the invention the partial cut score is executed such that not only the reinforcing strip but also the underlying carton is completely severed.

The partial cut scoring also determines the subsequent width of the tear strip. In order to tear open a pack equipped with the adhesive tape of the invention, the entire reinforcing strip can be utilized, particularly if it is not too wide. Preferably only a partial region of the reinforcing strip is selected as the tear strip.

The width of the reinforcing strip is preferably between 10 and 25 mm, more preferably between 12 and 19 mm. In accordance with one preferred embodiment of the invention the tear strip has a width of 2 to 10 mm, more preferably between 3 and 6 mm.

The partial cut score can be executed in the form of two limbs in a V-shape which limbs do not contact one another at the potential intersection point.

With further preference a punch line joins the two other ends of the limbs, producing the form of a triangle with the top missing. This triangle forms the grip tab on the tear strip.

In order to produce a suitable grip tab, the reinforcing strip must be severed in the transverse direction, in other words against the stretching, in some form. In order to determine the width of the tear strip—if the tear strip is to be arranged centrally in the reinforcing strip—it is necessary for two incisions in lengthwise direction to sever the reinforcing strip. For example, the reinforcing strip could be punctured at two points whose connecting line is incised into the strip (preferably this connecting line is aligned at right angles to the long edge). If the tear strip is to be formed in the marginal region of the reinforcing strip, a single incision is sufficient (see for example FIG. 4).

In this way, the preferred embodiment of the invention is produced, namely that in which the tear strip resulting from the reinforcing strip is lower in width than the reinforcing strip.

The grip tab need not necessarily be die-cut into the carton. It is also possible to produce the grip tab using a blade, by at least partly severing the reinforcing strip in transverse direction and, at the parting line, introducing two notches, pointing substantially in machine direction, into the reinforcing strip, the distance between the notches defining the width of the tear strip. The notches and the incision define a grip tab region which forms the beginning of the tear strip.

For example, the adhesive tape described is bonded, during corrugated board production, for example, on the corrugated board ply, to the inside outer paper of the corrugated board. In further steps, the sheet formed after the corrugated board line is converted further into a box, of the kind utilized for beverage bottles, for example, having handles die-cut into the end faces. In this arrangement, the adhesive tape is bonded directly over the handle holes. On one of the two side walls, a partial cut score is made in the strip of the adhesive tape, and makes it possible to extract a grip tab from the adhesive tape for the purpose of subsequent opening of the pack. This grip tab is pulled, and the grip tab strip which forms from the adhesive tape strip separates the board ply located directly above it from the box in the course of the opening operation.

The carrying of the beverage box is therefore adequately supported by the adhesive tape. After the end customer has carried the pack home, for example, the end user is able to open the pack reliably by utilizing the partial cut scoring with the tear strip incorporated in the adhesive reinforcing tape.

Where a carton has anti-bulge reinforcement in the form of two or more adhesive tape strips arranged at planes of different height oriented parallel to the base, the first effect of the adhesive tape strips is the reinforcing effect during transport. Thereafter the pack can be opened using the topmost of the reinforcing strips. If die-cuts have been made in the underlying reinforcing strips as well, it is then possible to reduce the size of the pack, for example, as the fill level goes down. This reduces the space needed to accommodate the pack.

Moreover, the edge which remains can be protected from wear by the remaining remnant of the adhesive tape.

With further preference the adhesive tape of the invention can be employed on a pack where the outside outer paper of the corrugated board has been deliberately scored at the point where the tear strip is later pulled out. In this way a clean edge is produced on the outside of the pack. By virtue of the present invention, a clean torn edge is also produced in the interior of the box as well, and enhances the overall impression for sales packaging.

The invention is illustrated in more detail below with reference to a number of figures, without any intention thereby to restrict the invention unnecessarily.

Figure 3:
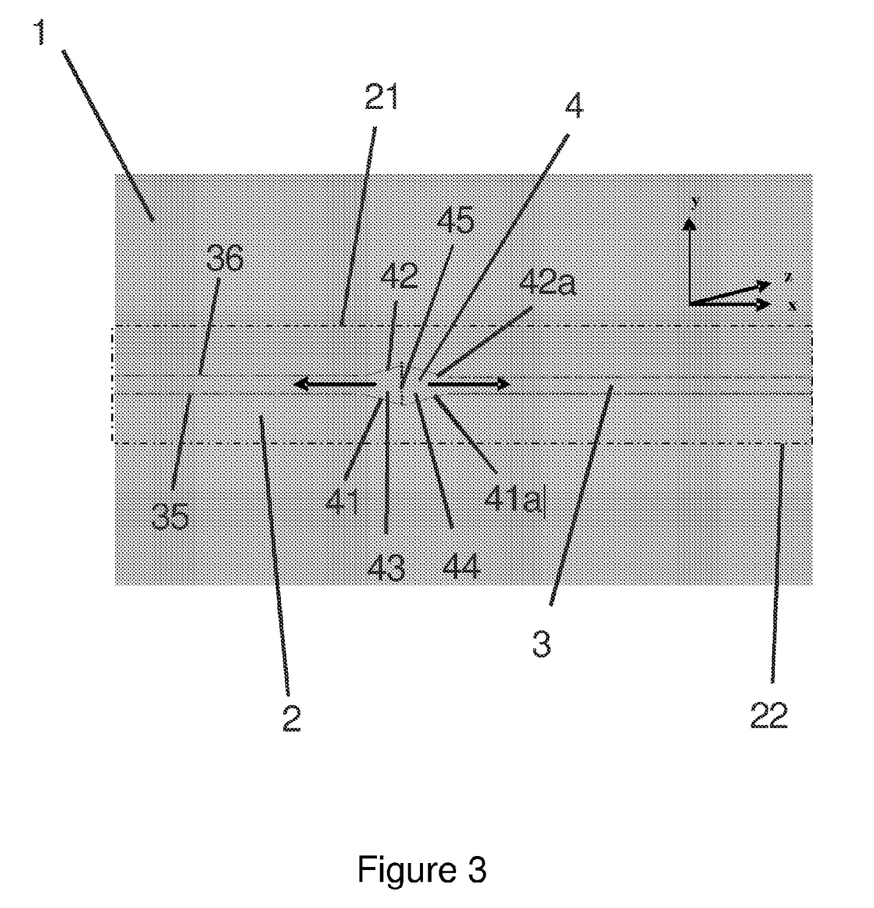
FIG. 3 shows a section from a pack in which a reinforcing strip is applied on one side wall.
Figure 4:
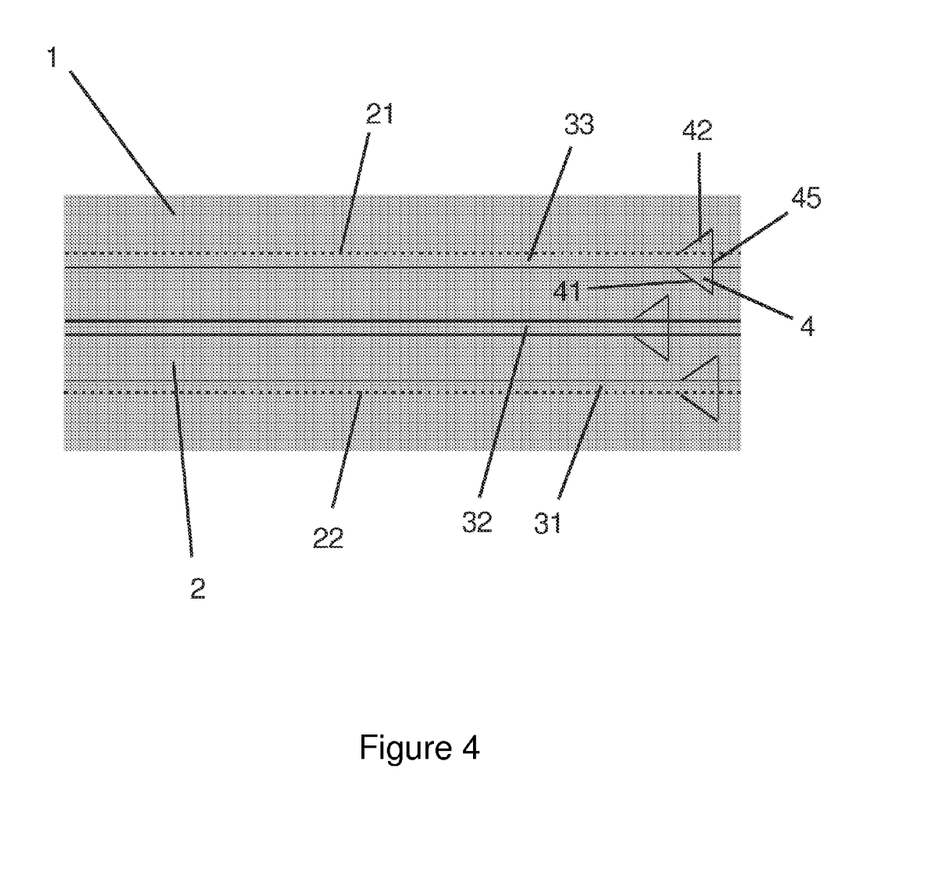
FIG. 4 shows a section from a pack in which a reinforcing strip is applied on one side wall, a number of tear strips being indicated in the reinforcing strip.

FIG. 3 shows a section from a pack in which a reinforcing strip is applied on one side wall, and FIG. 4 shows a section from a pack in which a reinforcing strip is applied on one side wall, a number of tear strips being indicated in the reinforcing strip.

In FIG. 3 is a section from a pack with a reinforcing strip 2 on one side wall 1. The reinforcing strip 2 is limited in its width by the margins 21 and 22, and extends over the entire side wall 1.

In the reinforcing strip 2 there is a partial cut score 4 which produces two grip tabs 43, 44. The partial cut score 4 is composed of two pairs of two V-shaped limbs 41, 42, 41*a*, 42*a*, with the two limbs of each pair not intersecting at the potential intersection point. These limbs are fully die-cut through the side wall 1 and through the reinforcing strip 2. The connecting line 45 which connects the end points of the limbs with one another is preferably likewise fully die-cut.

To open the pack, one of the two grip tabs 43, 44, the grip tab 43 for example, is gripped and folded up. The fully die-cut limbs 41, 42 produce a tear strip 3 whose width corresponds to the distance between the ends of limbs that run towards one another. The width of the grip tab strip 3 is indicated by the parallel lines 35, 36. When the grip tab 43 is pulled in the direction of the arrow shown, the reinforcing strip 2 parts along the lines 35, 36. This resultant strip forms the grip tab strip 3.

Owing to the outstanding properties of the film described, the grip tab strip 3 does not taper either during opening, and so the grip tab strip severs the entire carton.

Pulling on the other grip tab 44, likewise in the direction indicated by the arrow, produces a second grip tab strip 3.

FIG. 4 shows a section from a pack in which a reinforcing strip 2 is applied on one side wall 1, there being a number of tear strips 31, 32, 33 indicated in the reinforcing strip 2. The partial cut score 4 described in FIG. 3 need in this case not always lie in the centre of the reinforcing strip 2.

The position of the partial cut score 4 is variable. It may lie in the middle (tear strip 32) or else in the marginal region (tear strips 31, 33), provided that a limb 41 of the V-shaped partial cut score still lies completely in the reinforcing strip 2 and is extracted by a tear strip 3 which is sufficiently wide for the pack.

The invention claimed is:

1. A method for reinforcing cardboard packaging and simultaneously providing a tear strip for said cardboard packaging, said method comprising applying a strip of an adhesive tape to said cardboard packaging at a suitable site of the packaging where the strip can simultaneously function as a tear strip and also provide reinforcement, wherein said strip of an adhesive comprises a carrier material, and the carrier material comprises a polyolefin film oriented monoaxially in the lengthwise direction of the strip, the film comprising a mixture of (a) an olefinic polymer selected from the group consisting of propylene homopolymers and copolymers, (b) 5-30% by weight of the mixture of a polar non-olefinic polymer selected from the group consisting of polybutylene terephthalate and polyoxymethylene and (c) 0.2-10% by weight of the mixture of a polar-modified polyolefin selected from the group consisting of ethylene vinyl acetate copolymers, ethylene vinyl alcohol copolymers and polypropylene grafted with maleic anhydride.

2. Method according to claim 1, wherein the adhesive tape film is composed of a matrix of the olefinic polymer in which fibers of the polar non-olefinic polymer are embedded which fibers have a diameter of 0.01 to 50 μm.

3. Method according to claim 1, wherein the adhesive tape film has
a thickness of 15 to 200 μm,
a machine-direction draw ratio of at least 1:4.5,
a machine-direction tensile strength of at least 200 N/mm$^2$,
a machine-direction stress at 10% strain of at least 150 N/mm$^2$, and/or
a cross-direction tear propagation resistance of at least 400 N/mm.

4. Method according to claim 1, wherein the polypropylene copolymer comprises propylene to an extent of at least 50% by weight.

* * * * *